(12) United States Patent
Brehm et al.

(10) Patent No.: US 6,998,568 B2
(45) Date of Patent: Feb. 14, 2006

(54) METHOD FOR FABRICATING, MODIFYING OR REPAIRING OF SINGLE CRYSTAL OR DIRECTIONALLY SOLIDIFIED ARTICLES

(75) Inventors: Walter Brehm, Gebenstorf (CH); Matthias Hoebel, Windisch (CH); Edward Obbard, Jersey (GB); Alexander Schnell, Ennetbaden (CH)

(73) Assignee: Alstom Technology LTD, Baden (CH)

( * ) Notice: Subject to any disclaimer, the term of this patent is extended or adjusted under 35 U.S.C. 154(b) by 199 days.

(21) Appl. No.: 10/721,268

(22) Filed: Nov. 26, 2003

(65) Prior Publication Data

US 2004/0164059 A1 Aug. 26, 2004

(30) Foreign Application Priority Data

Nov. 29, 2002 (EP) ............................................. 02406040

(51) Int. Cl.
B23K 26/00 (2006.01)
B23K 26/34 (2006.01)

(52) U.S. Cl. ............................ 219/121.62; 219/121.66; 219/121.83; 219/121.64; 228/176

(58) Field of Classification Search ....... 219/121.61–121.66, 219/219/121.83–121.85; 228/176; 117/1, 904; 416/224, 241 R; 29/889.1, 29/889.2

See application file for complete search history.

(56) References Cited

U.S. PATENT DOCUMENTS

| | | |
|---|---|---|
| 3,690,367 A | 9/1972 | Daniels |
| 4,188,237 A | 2/1980 | Chasteen |
| 4,285,459 A | 8/1981 | Baladjanian et al. |
| 4,323,756 A | 4/1982 | Brown et al. |
| 4,381,944 A | 5/1983 | Smith, Jr. et al. |
| 4,960,501 A | 10/1990 | Sivilotti |
| 5,071,486 A | 12/1991 | Chasteen |
| 5,156,321 A | 10/1992 | Liburdi et al. |
| 5,395,584 A * | 3/1995 | Berger et al. ............... 420/443 |
| 5,437,737 A | 8/1995 | Draghi et al. |
| 5,530,221 A * | 6/1996 | Benda et al. .......... 219/121.83 |
| 5,554,837 A * | 9/1996 | Goodwater et al. .... 219/121.63 |
| 5,622,638 A | 4/1997 | Schell et al. |
| 5,666,643 A | 9/1997 | Chesnes et al. |
| 5,728,227 A | 3/1998 | Reverman |
| 5,732,467 A | 3/1998 | White et al. |
| 5,837,960 A | 11/1998 | Lewis et al. |
| 6,024,792 A | 2/2000 | Kurz et al. |
| 6,046,426 A | 4/2000 | Jeantette et al. |
| 6,050,477 A | 4/2000 | Baumann et al. |
| 6,350,326 B1 | 2/2002 | McCay et al. |
| 6,534,745 B1 * | 3/2003 | Lowney ................. 219/121.84 |

FOREIGN PATENT DOCUMENTS

| | | |
|---|---|---|
| DE | 19949972 | 2/2001 |
| EP | 0034041 | 8/1981 |
| EP | 0558870 | 9/1993 |
| EP | 0749790 | 12/1996 |
| EP | 1001055 | 5/2000 |
| EP | 1074331 | 2/2001 |

* cited by examiner

*Primary Examiner*—Samuel M. Heinrich
(74) *Attorney, Agent, or Firm*—Burns, Doane, Swecker & Mathis, L.L.P.

(57) ABSTRACT

It is disclosed a method for fabricating, modifying or repairing of single crystal or directionally solidified articles. Two single crystal or directionally solidified prefabricated parts are joint by isothermally brazing using a brazing material. After that an epitaxial or non-epitaxial layer on the surface of the created article and of the braze joint is applied using a laser metal forming process.

15 Claims, 3 Drawing Sheets

METHOD FOR FABRICATING, MODIFYING OR REPAIRING OF SINGLE CRYSTAL OR DIRECTIONALLY SOLIDIFIED ARTICLES

FIELD OF THE INVENTION

The invention relates to a method for fabricating, modifying or repairing of single crystal (SX) or directionally solidified (DS) articles according to the claim 1.

BACKGROUND OF THE INVENTION

In the last years laser metal forming (LMF) has been introduced in industrial manufacturing. Laser metal forming is a process where a high power laser locally melts a focussed stream of metal powder or a metal wire onto a substrate. In this way material can be added to the underlying part. The method is suitable for controlled material build-up and the laser generated parts are characterised by a dense microstructure which is usually free of pores.

Laser metal forming has been recently used for commercial manufacturing of superalloys due to its attractive potential for repair of locally damaged or worn parts. Indeed, it is possible to selectively add material at desired locations and to re-establish the full functionality of a component. It is clear that laser repair technology is particularly attractive for the refurbishment of expensive parts that are affected by local damage or local mechanical wear. Turbine blades and vanes are typical examples.

However, the process is complicated when single-crystal components have to be refurbished. Single crystal blades and vanes can be found in the most heavily loaded rows of modern gas turbines (first or high pressure row). Their mechanical integrity relies on the particular properties due to single-crystal microstructure and the absence of grain boundaries. Reconditioning of such components is only feasible if the single crystal microstructure can be maintained during the repair process.

So far, several patents have been issued for the laser metal forming process. The basic principle is described in EP-A1-0 558 870, DE-C1-199 49 972, U.S. Pat. Nos. 5,837,960, 5,622,638 or 4,323,756. During laser metal forming substrate material is locally molten and powder (or wire) is injected into the melt pool with a suitable powder (or wire) feeder mechanism. After a certain interaction time (which is determined by the laser spot size and the relative movement between laser and substrate) the molten material resolidifies leading to material build-up on the substrate. The process carries the particular advantage that, being numerically controlled, new design can be created offline and subsequent relatively quickly realised as prototype components. Processing occurs on a part-by-part basis, which, in great contrast to casting technology, ultimately gives the possibilities of reducing the batch size to just one component. A range of materials may be deposited by the same process so that specialised oxidation, wear or corrosion resistant regions may be formed as different parts of a functionally graded component. However, there are serious limitations, which limit the applicability of this otherwise useful process. Firstly, control over the deposited material, though thoroughly adequate for predominantly surface-based operations, is difficult to maintain as deposits become large and extensive. A second barrier to the metal forming of large monoliths is simply that the mass deposition rates, currently available in the art of epitaxial laser metal forming, would make the formulation of such artefacts an extremely time consuming operation. The fabrication of a large component would therefore best be achieved by commencing with a basic single crystal preform or blank, and modifying its shape by way of controlled addition of SX material. Thirdly, the powder stream may not be directed in all places it would be desired, because the proximity of the edges of other parts of the component obstruct the gas/power stream and make the process enviable. Such a feature, in which it is impossible to conduct epitaxial laser metal-forming is e.g. a large gap or crack. This limits the usefullness of the process in certain repair and modification operations.

Such a feature, in which it is impossible to conduct epitaxial laser metal-forming is e.g. a large gap or crack. This limits the usefulness of the process in certain repair and modification operations.

On the other hand other methods are generally known for repairing high temperature superalloys: U.S. Pat. No. 5,732,467 discloses a method of repairing cracks on the outermost surface of an article having a directionally oriented microstructure and a superalloy composition. The repairing is done by coating the cleaned crack surface with a material featuring the same material composition as said article. Thereby the coated crack surface is subjected to an elevated temperature and isostatic pressure over a period of time sufficient to repair the crack surface without changing the crystalline microstructure of the parent article.

In addition, a number of alternative methods of brazing for repairing cracks or gaps are known. U.S. Pat. No. 5,666,643 discloses a braze material for repairing an article, in particular components made from a cobalt and a nickel-base super-alloy, such as gas turbine engine parts. The braze material is composed of particles featuring a high melting temperature which are distributed within the a braze alloy. These particles could be of single crystal, directionally solidified, or equiaxed microstructure. But, even if particles featuring a single crystal structure are used, the structure of the repaired crack as a whole due to the braze alloy differs with respect to material properties from the single-crystal structure of the base material which leads to weakness problems of the brazed joint. This is especially valid for cracks located at stress concentrations.

The same problem occurs with the repair methods disclosed in U.S. Pat. Nos, 4,381,944 or 5,437,737 where a braze alloy and a filler material are used at the same time to increase the strength of the brazed joint. Another method of repairing sintering is disclosed in U.S. Pat. No. 5,156,321.

SUMMARY OF THE INVENTION

It is the aim of the present invention is to provide an advanced method for the repair, modification and small batch manufacture of single crystal components such as those used in gas turbine engines.

According to claim 1 a method was found for fabricating, modifying or repairing of single crystal (SX) or directionally solidified (DS) articles 1 by using an isothermal brazing operation that maintains the SX or DS nature of the article and the subsequent step of applying an epitaxial or non-epitaxial layer on the surface of the article and of the braze joint using a laser metal forming process.

According to the present invention, it is proposed that single crystal isothermal brazing be employed for replacing significant or deep portions of a blade undergoing repair or modification or for creating a standard blank blade from machined sections in the case of rapid prototyping. Isothermal brazing is a proven process for the joining of parts while maintaining their single crystal character. Because the composition of the brazed joint is near or identical to the substrate composition, a melting process such as epitaxial or non-epitaxial laser metal-forming can be successfully used on top of a brazed joint with no ill effects. In that way a coating layer can be applied. Quality of the joints, in terms of its single crystal character, is also better than attempted single crystal welded junctions.

Components may be fabricated, modified or repaired by an isothermal brazing process, but only up to the limit of the feasibility of cutting, machining and brazing inserts or strips from single crystal stock material having the same orientation as the component. Beyond this feasibility, when brazed modification/repair would involve unreasonably complex insert design and costly, one-off machining to achieve the necessary tight braze-gap tolerances, epitaxial laser metal-forming is a preferable method for the controlled build-up of single crystal material.

Epitaxial laser metal-forming is also a suitable method for the deposition of additional single crystal material to create a finished repair on a variously shaped, worn component or to add an offline-designed surface section to a rapid prototype component. The laser metal forming step can include the deposition of materials having specialised properties, which can be varied according to the requirements of certain regions of the component.

With the online monitoring system and using automatic feedback control of at least one process parameter such as laser power it is possible to establish and maintain optimum process conditions during the laser metal-forming process. In this favourable case the columnar to equiaxed transition (CET) and melt pool convection are avoided and a temperature field is created in the melt pool which leads to defect-free, epitaxial growth of the deposited material. Thus, it is possible to add new material without creation of grain boundaries. Beside the laser power process parameters like the relative speed between laser beam and the substrate, the carrier gas flow and mass feed rate of added material can be controlled.

BRIEF DESCRIPTION OF THE DRAWINGS

Preferred embodiments of the invention are illustrated in the accompanying drawings, in which FIG. 5 illustrates an apparatus for carrying out the invention the present invention and FIG. 6 illustrates an overall control system for carrying out the invention.

The drawings show only the parts important for the invention. Same elements will be numbered in the same way in different drawings.

DETAILED DESCRIPTION OF THE INVENTION

Figure 1:
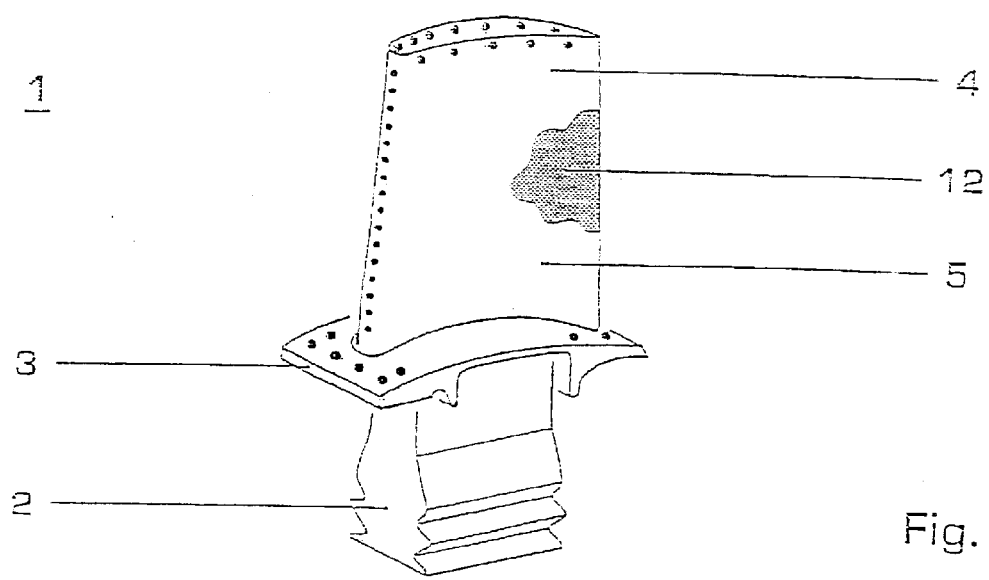
FIG. 1 illustrates a gas turbine blade.

FIG. 1 shows a single crystal (SX) or directionally solidified (OS) article 1 such as blades or vanes of gas turbine engines, the gas turbine blade comprising a root portion 2, a platform 3 and a blade 4 and having a surface 5. The article 1 can as an example be made from a nickel or cobalt based super alloy. Investment casting methods for producing such SX or DS articles are known e.g. from the prior art U.S. Pat. Nos. 4,960,501, 3,690,367 or EP-A1-0 749 790. These articles 1 are normally made from a nickel or cobalt base super alloy.

Figure 2:
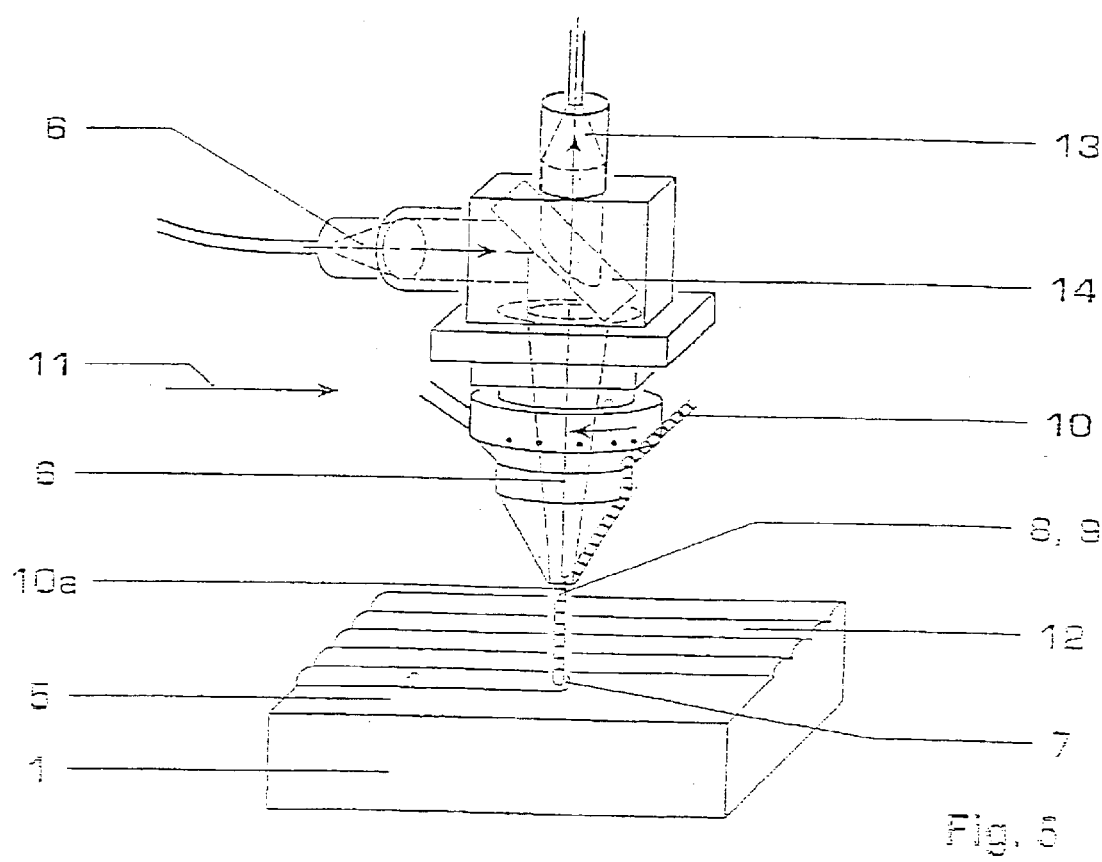
FIG. 2 illustrates a schematic situation in which epitaxial laser metal-forming may not be used to fill the gap.
Figure 3:
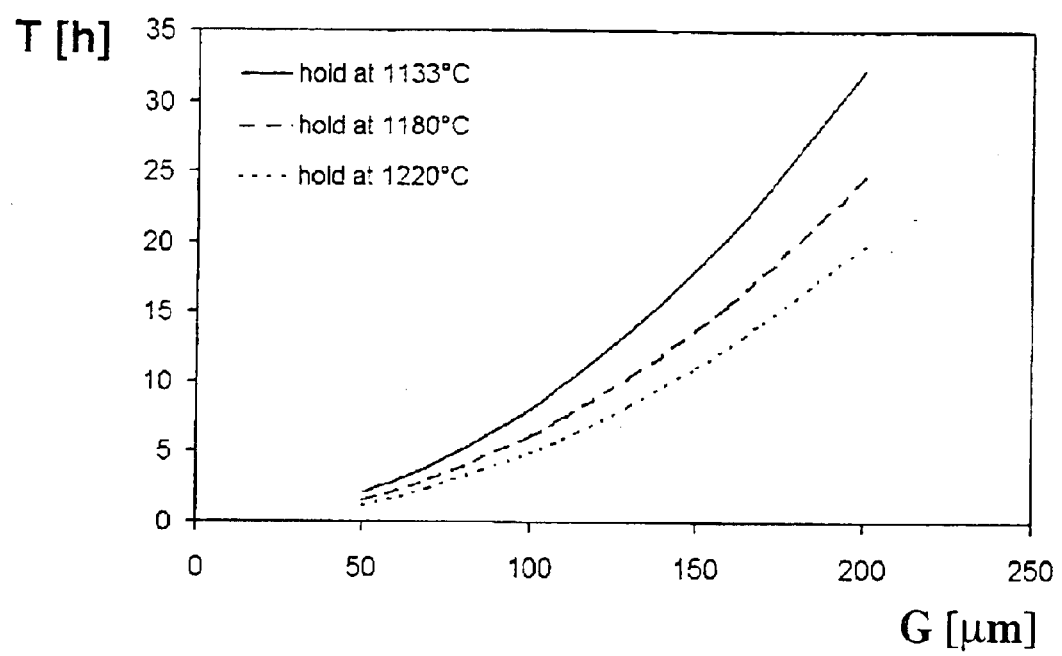
FIG. 3 shows the dependence of isothermal solidification time T on the gap width G of the braze metal region, FIG. 4a, b shows a schematic melting point profile in the direction across a brazed joint before (FIG. 4a) and after (FIG. 4b) the brazing operation.
Figure 2:
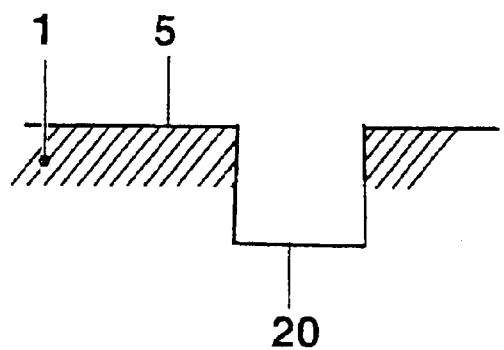

The herein disclosed method can be used for fabricating, modifying or repairing of such single crystal (SX) or directionally solidified (DS) articles 1. Thereby in a first step of the inventive method two single crystal (SX) or directionally solidified (DS) prefabricated parts are joint together by using an iso-thermal brazing operation with a brazing material. According to FIG. 2 where a gap 20 or crack of the surface 5 of gas turbine articles 1 are brazed there can be a need of a brazing insert 21, not shown in FIG. 2. If only a narrow crack is repaired, there will be no need for a brazing insert. This brazing insert 21 can be prepared from the roots of scrap or decommissioned blades. Care has to be taken to match the crystallographic orientation of mating parts to with desired specification, which has commonly been an angle below 6° misorientation, thereby creating a low angle grain boundary between mating parts, which is in any case present between dendrites. Fit-up tolerances must be sufficiently low to ensure gaps are not more than 120 $\mu$m as shown in FIG. 3, the time required for diffusion-driven isothermal solidification is dependent on the gap width. Wide gaps 20 require prohibitively long heat treatment cycles.

The braze material used is composed of a highly similar composition to the base material, yet with the addition of approximately 2 wt.-% boron, which acts as melting point suppressor of the alloy. During heating the braze material melts at a temperature of approximately 1100°, which is insufficient to cause any incipient melting of the base material of the article 1. The brazing is done under a preferable and suitably controlled atmosphere, which is in most cases vacuum. During the holding time, boron, being a small and diffusively mobile atom, diffuses from the braze material into the base material. The depletion of boron concentration and associated rise of the local melting point of the braze material causes two epitaxial, planar solidification fronts of the γ-nickel phase to converge towards the center of the brazed gap 20. Their progress being controlled by falling boron concentration gradients across the gap width. Upon controlled cooling, γ' precipitates into the γ-matrix forming a brazed junction effectively identical to the base material. Following the heat treatment, the boron is found to be stable in the base material as $M_5B_3$-type borides: M being commonly Cr, W or Ni.

Before applying the method of isothermal brazing as described the surface of the crack or gap may be cleaned from oxides by a Flour-on-Cleaning (FIC) process, which is widely known in state of the art. The FIC process removes the stable $Al_2O_3$ oxides and depletes Al from the surface, thereby improving the braze flow and the repair of the cracked components. The process subjects the oxidized (and sulphidized) components to a highly reducing gaseous atmosphere of hydrogen and hydrogen fluoride at high temperatures, which may vary from 900° C. to 1000° C. Such FIC-processes are disclosed, for example, in EP-B1 -34041, U.S. Pat. Nos. 4,188,237, 5,728,227 or in 5,071,486.

Figures 4A, 4B:
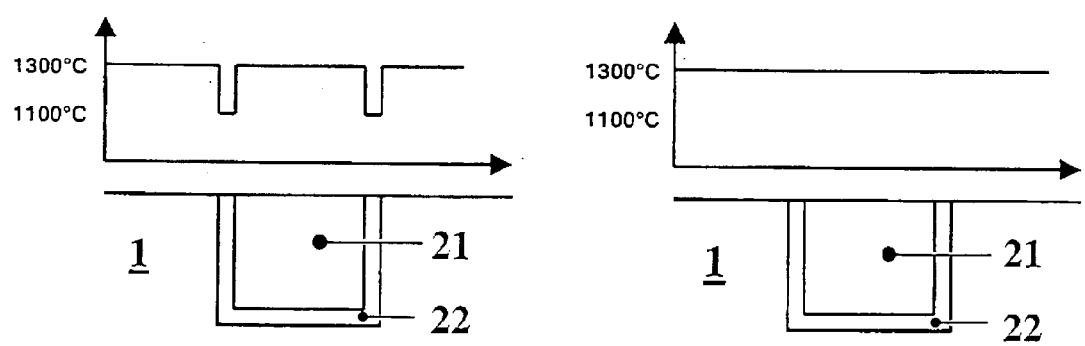

As seen in FIGS. 4a, b, the principal advantage of the isothermal brazing process and the particular feature, which enables the combination of the processes described in this patent, is that after treatment the melting point across the brazed region is the same as that of the base material (FIG. 4b). For comparison FIG. 4a shows the same profile before the brazing operation. There fore the presence of the joint does not affect any subsequent fusion process carried out on the same component. Brazed regions can effectively be ignored at this stage because they are sufficiently similar to the base material, in both melting point and crystallographic orientation as to have no influence on the subsequent metal-forming process.

After the brazing step, an epitaxial or nonepitaxial laser metal-forming is performed on the surface of the article and the created braze joint. Epitaxial or non-epitaxial laser metal-forming uses a continuous wave laser to create a moving melt pool on the surface of a single crystal metal substrate. High power lasers such as $CO_2$, (fibre coupled) Nd-YAG or (fibre coupled) high power diode lasers offer a particularly attractive choice as energy source. Laser radiation can be focussed to small spots and can be easily modulated which allows precise control of the energy input into the material.

FIG. 5 shows as an example an apparatus for controlled laser metal forming on the surface 5 of the article 1 according to the present invention. A laser beam 6 is moved over the surface 5 of the article 1 (or the article 1 is moved relative to the laser beam) thereby locally melting the surface 5 to form a melt pool 7. For coating or other laser metal forming applications material in the form of jet of powder 8 with a carrier gas 9 by means of a feeder 10 with a nozzle 10a or a wire is added to the melt pool 7. From the melt pool 7 an optical signal 13 is continuously captured and used for the determination of the temperature, the temperature fluctuations and existing temperature gradients as properties of the melt pool 7. With the present coating method a multiple or layered coating 12 can be applied. The process parameter can then be altered for different layers of the coating 12 or for different parts of the same layer of the coating 12. The present method also facilitates the coating of three dimensional (3D) objects. In one embodiment as seen in FIG. 2 the powder 8 injection can be concentric with respect to the cone of captured optical signals 13 from the melt pool 7. It is possible to mix a multiple powder compositions and supply the mixture concurrently to the melt pool 7 via nozzle 10a.

Figure 6:
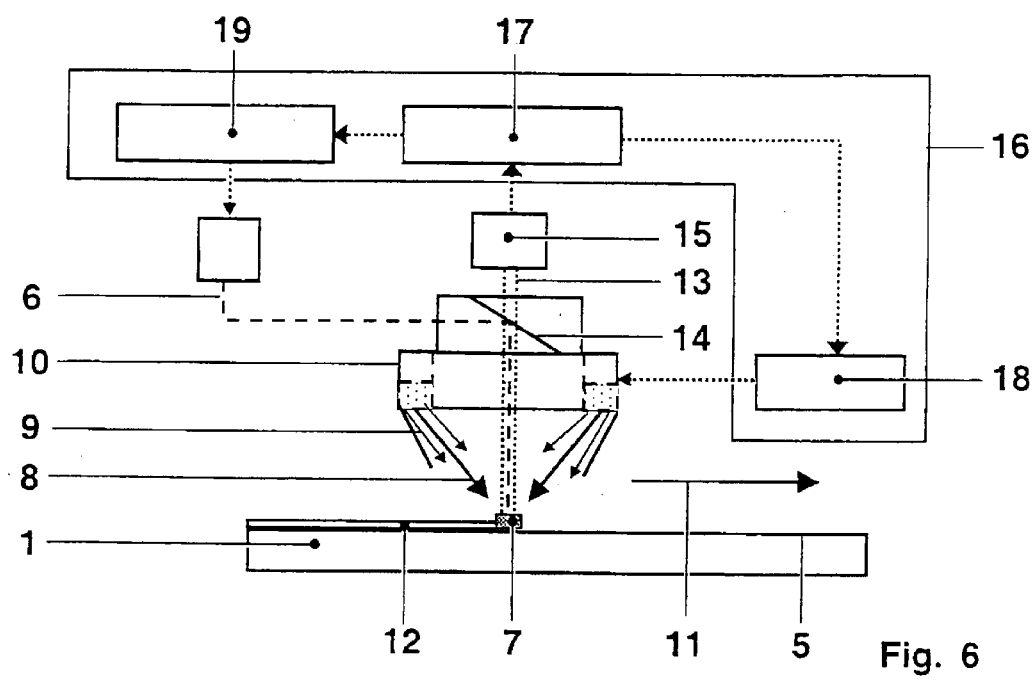

As seen from the FIG. 6, the information of the optical signal 13 is used in a feedback circuit within a control system 16 to adjust process parameter such as the laser power by means of a controller 19, the relative speed between the laser beam 6 and the substrate, the flow rate of the carrier gas 9, the mass feed rate of the injected powder 8, the distance between the nozzle 10a and the article 1 and the angle of the nozzle 10a to the article 1 by means of a controller 18 in a way that desired melt pool 7 properties are obtained. Subsequently the melt pool 7 solidifies as an applied layer 12 as seen in FIG. 5.

The method uses a combination of a concentric feeder 10, a fiber coupled laser and an on-line monitoring system with real time capability. With the help of the online monitoring system optimum process conditions are established and maintained where the columnar to equiaxed transition (CET) and melt pool convection are avoided. Hence, defect-free, epitaxial growth of the deposited material is observed. It is thus possible to add new material without creation of grain boundaries.

The new method combines laser power delivery, material supply and process monitoring in a dedicated laser/powder head as shown in FIG. 5. With the help of a dichroitic mirror 14 infrared (IR) radiation from the melt pool 7 is collected through the same optics which is used for laser focussing. The dichroitic mirror 14 transmits laser light and reflects process light of the optical signal 13 or vice versa.

The optical signal 13 from the melt pool 7 is coupled to a pyrometer 15 or another fiber-coupled detector which allows the online determination of the melt pool temperature. For this purpose the optical properties of the monitoring system are chosen such that the measurement spot is smaller than the melt pool and located at the center of the melt pool 7.

The cone of captured optical signals 13 from the melt pool 7 can be concentric with respect to the laser focussing cone. The symmetry of this arrangement ensures that laser-powder interaction does not change during movements on complex shaped components. This leads to consistent high quality of the process.

FIG. 6 shows the overall control system 16 for carrying out the invention. Besides a main process control 16 a controller 18 for controlling the feeder 10 and the whole apparatus and a controller 19 for controlling the laser is provided. The temperature information is used for the adjustment of process parameters such as the laser power, the relative speed between the laser beam 6 and the article 1, the feed rate of the injected powder 8 with the carrier gas 9 or an injected wire, the distance between the nozzle 10a and the article 1 and the angle of the nozzle 10a to the article 1. This automatic feed-back control of the laser power by means of the controller 19 allows to establish a temperature field which is favourable for obtaining a desired microstructure.

REFERENCE NUMBERS

1 Article, e.g. blades or vanes for gas turbines
2 Root portion
3 Platform
4 Blade
5 Surface of article 1
6 Laser beam
7 Melt pool
8 Powder
9 Carrier gas
10 Feeder
11 Direction of movement
12 Layer of solidified material, Coating
13 Optical signal
14 Dichroitic mirror
15 Pyrometer
16 Control system
17 Main process control
18 Controller for feeder 9
19 Controller for laser
20 Gap
21 Brazing insert
22 Braze joint
G Gap width [$\mu$m]
T Solidification time [h]

What is claimed is:

1. A method for fabricating, modifying or repairing of single crystal or directionally solidified articles, the method comprising the steps of (a) joining of two single crystal or directionally solidified prefabricated parts with matched crystallographic orientation by isothermally brazing using a brazing material, (b) applying a layer on the surface of the article and of the braze joint using a laser metal forming process, thereby (c) moving a light source and a signal capturing apparatus and the article relative to each other, thereby (d) melting locally the surface of the article or of the braze joint using the light source with a specific power for forming a melt pool, (e) injecting powder with a carrier gas or a wire into the melt pool, (f) capturing an optical signal from the melt pool using the signal capturing apparatus, (g) using the monitored optical signal for the determination of temperature and temperature fluctuations as properties of the melt pool, (h) using the information of the temperature and temperature fluctuations of the melt pool from the optical signal within a control system in a feedback circuit to adjust as process parameters one or a combination of the power of the light source, the relative speed between the light source and the article, the mass feed rate of the added material and/or of the carrier gas such that desired melt pool properties are obtained and subsequently (i) solidifying the melt pool.

2. The method according to claim 1, comprising the step of adjusting the melt pool properties to obtain epitaxial material build-up with thermo-physical properties of the deposit matched to those of the article and of the braze joint.

3. The method according to claim 1, the laser deposited material solidifies non-epitaxially with the underlying material.

4. The method according to claim 1, comprising the step of applying a coating on the surface of the article and of the braze joint using the laser metal forming process.

5. The method according to claim 1, comprising the step of mixing multiple powder compositions and supplying the mixture concurrently to the melt pool during the laser metal-forming process.

6. The method according to claim 1, comprising the step of using different powder compositions at different regions for the application of the laser deposited layer of the surface of the article or of the braze joint.

7. The method according to claim 1, comprising the step of determining the crystallographic orientation of the prefabricated parts and joining the parts together so as to create a low angle boundary.

8. The method according to claim 1, comprising the step of repairing gaps or cracks of an article.

9. The method according to claim 8, comprising the step of repairing gaps of an article using a brazing insert.

10. The method according to claim 9, comprising the steps of using a brazing insert which has the same crystalline orientation as the article.

11. The method according to claim 9, comprising the step of preparing the brazing insert from used gas turbine articles before carrying out the method.

12. The method according to claim 8, comprising the step of cleaning gaps or cracks from unwanted oxides before the application of the method.

13. The method according to claim 9, wherein the brazing is done under vacuum or any preferable and suitably controlled atmosphere.

14. The method according to claim 1, comprising the adjusting of the parameters of the epitaxial laser metal-forming step such that melt pool properties are obtained to avoid columnar to equiaxed transition during solidification of the melt pool.

15. The method according to claim 1, comprising the adjusting of the process parameters of the epitaxial laser metal-forming step such that melt pool properties are obtained to avoid convection in the melt pool.

* * * * *